US012312870B2

(12) United States Patent
Lastra Melo et al.

(10) Patent No.: US 12,312,870 B2
(45) Date of Patent: May 27, 2025

(54) SPLIT DOWNHOLE TRANSFORMER FOR HIGH POWER APPLICATIONS

(71) Applicant: SAUDI ARABIAN OIL COMPANY, Dhahran (SA)

(72) Inventors: Rafael Adolfo Lastra Melo, Dhahran (SA); Jamie Cochran, Aberdeenshire (GB); Jinjiang Xiao, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/474,932

(22) Filed: Sep. 26, 2023

(65) Prior Publication Data

US 2025/0101812 A1 Mar. 27, 2025

(51) Int. Cl.
*E21B 17/00* (2006.01)
*E21B 17/02* (2006.01)
(Continued)

(52) U.S. Cl.
CPC .......... *E21B 17/003* (2013.01); *E21B 17/028* (2013.01); *E21B 43/128* (2013.01); *H01F 27/28* (2013.01)

(58) Field of Classification Search
CPC ................. E21B 17/003; E21B 17/028; E21B 17/00283; E21B 17/00285; E21B 43/128;
(Continued)

(56) References Cited

U.S. PATENT DOCUMENTS 4,585,287 A * 4/1986 Ramsey ............... G02B 6/3816
439/588
4,605,268 A 8/1986 Meador
(Continued)

FOREIGN PATENT DOCUMENTS

CN 216161551 U 4/2022
EP 1 899 574 B1 5/2016

OTHER PUBLICATIONS

Höganäs AB, "Somaloy, powders for electromagnetic applications"; <https://www.hoganas.com/en/powder-technologies/soft-magnetic-composites/products/coated-powders-for-electromagnetic-applications/>; Accessed Sep. 25, 2023 (5 pages).

*Primary Examiner* — Yanick A Akaragwe
(74) *Attorney, Agent, or Firm* — Osha Bergman Watanabe & Burton LLP

(57) ABSTRACT

A system includes production tubing installed in the well and a female component connected to the production tubing comprising a female component body located in a housing, primary coils wound through the female component body, and a borehole delineated by an inner circumferential surface of the female component body and having a borehole axis. The borehole outlines a shape. The system also includes a male component electrically connected to the electrically powered tool and configured to be inserted into the borehole of the female component. The male component includes a male component body having an external surface formed in the shape, secondary coils wound through the male component body, and a conduit extending through the male component body and having a conduit axis. The borehole axis and the conduit axis line up when the male component is inserted into the borehole of the female component. The system further includes a split downhole transformer formed by installation of the male component into the female component. Formation of the split downhole transformer allows power to transfer from a surface location to the electrically powered tool installed in the production tubing downhole in the well.

18 Claims, 9 Drawing Sheets

(51) Int. Cl.
*E21B 43/12* (2006.01)
*H01F 27/28* (2006.01)

(58) Field of Classification Search
CPC .... E21B 34/066; E21B 17/023; E21B 17/025; E21B 17/026; H01F 27/28
See application file for complete search history.

(56) References Cited

U.S. PATENT DOCUMENTS

| | | | | |
|---|---|---|---|---|
| 6,126,894 | A * | 10/2000 | Moxson | C22C 33/0264 419/39 |
| 7,775,275 | B2 | 8/2010 | Patel | |
| 9,742,106 | B2 * | 8/2017 | Kenison | H01R 13/64 |
| 2011/0011596 | A1 * | 1/2011 | Martinez | E21B 43/128 166/372 |
| 2019/0284927 | A1 | 9/2019 | Pihl | |
| 2019/0379131 | A1 * | 12/2019 | Nguyen | H01Q 21/0025 |
| 2020/0056462 | A1 * | 2/2020 | Xiao | H02K 1/2791 |
| 2021/0189805 | A1 * | 6/2021 | Beck | F04B 47/06 |
| 2021/0262308 | A1 * | 8/2021 | Kelly, III | E21B 17/07 |
| 2022/0200343 | A1 | 6/2022 | Pihl | |
| 2023/0243241 | A1 * | 8/2023 | Fenocchi | F03B 13/02 290/54 |
| 2023/0335943 | A1 * | 10/2023 | Obermeyer | H02K 5/132 |

* cited by examiner

SPLIT DOWNHOLE TRANSFORMER FOR HIGH POWER APPLICATIONS

BACKGROUND

Hydrocarbons are located in porous rock formations beneath the Earth's surface. Wells are drilled into these formations to access and produce the hydrocarbons. Often, the natural pressure of the formation is sufficient to allow the hydrocarbons to flow to the surface through the well. However, some formations are unable to naturally produce the hydrocarbons and artificial lift may be required to enable the well to produce the hydrocarbons from the formation.

There are many categories and configurations of artificial lift, such as gas lift, pump jacks, electric submersible pumps (ESPs) etc. An ESP completion system includes an electric pump submersed in the production fluids in the well. As the pump is powered by electricity, power must be transferred downhole to the pump. As such, wet connectors are traditionally used to electrically connect and disconnect high power downhole loads, such as an ESP. However, wet connectors have low reliability due to high electrical currents, elevated temperatures, and failure of isolation barriers against contaminants and the production fluids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, methods and systems for providing power to an electrically powered tool downhole in a well. The system includes production tubing installed in the well. The system also includes a female component connected to the production tubing and comprising a female component body located in a housing, primary coils wound through the female component body, and a borehole delineated by an inner circumferential surface of the female component body and having a borehole axis. The borehole outlines a shape. The system also includes a male component electrically connected to the electrically powered tool and configured to be inserted into the borehole of the female component. The male component includes a male component body having an external surface formed in the shape, secondary coils wound through the male component body, and a conduit extending through the male component body and having a conduit axis. The borehole axis and the conduit axis line up when the male component is inserted into the borehole of the female component. The system further includes a split downhole transformer formed by installation of the male component into the female component. Formation of the split downhole transformer allows power to transfer from a surface location to the electrically powered tool installed in the production tubing downhole in the well.

The method includes manufacturing a female component comprising a female component body located in a housing, primary coils wound through the female component body, and a borehole delineated by an inner circumferential surface of the female component body and having a borehole axis, wherein the borehole outlines a shape. The method also includes manufacturing a male component comprising a male component body having an external surface formed in the shape, secondary coils wound through the male component body, and a conduit extending through the male component body and having a conduit axis. The method further includes connecting the female component to production tubing, installing the production tubing into the well, connecting the male component to the electrically powered tool, running the male component and the electrically powered tool into an interior of the production tubing, inserting the male component into the female component downhole in the well to form a downhole split transformer configured to allow power to transfer from a surface location to the electrically powered tool, and powering the electrically powered tool using the split downhole transformer.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Wells often require equipment powered by electricity to be used downhole to provide well services, such as artificial lift. Wet connectors are traditionally used to electrically connect and disconnect high power downhole loads. However, wet connectors have low reliability due to high electrical currents, elevated temperatures, and failure of isolation barriers against contaminants and production fluids.

When a wet connector fails, power is unable to be transferred to the downhole tool, rendering the downhole tool inoperable. Workover operations must be performed on the well to remedy the issue. Wells are thousands of feet deep, thus, workover operations require complex and large tools to perform the required operations. Furthermore, workover operations introduce risk as downhole pressures and production fluids are open to the environment. Thus, systems that are more reliable than wet connectors and can handle high currents and isolate the electrical systems from production fluids/contaminants are beneficial.

As such, the present disclosure outlines a split downhole transformer that may be used to provide an electromagnetic bridge for high power applications. The present disclosure uses an electric submersible pump (ESP) system to outline an application in which a split downhole transformer may be used. However, a person skilled in the art will appreciate that the split downhole transformer disclosed herein may be used to provide an electromagnetic bridge for any electrically powered tool that may be installed downhole in a well, such as separation systems, flow meters, sensors, actuators, etc.

Figure 1:
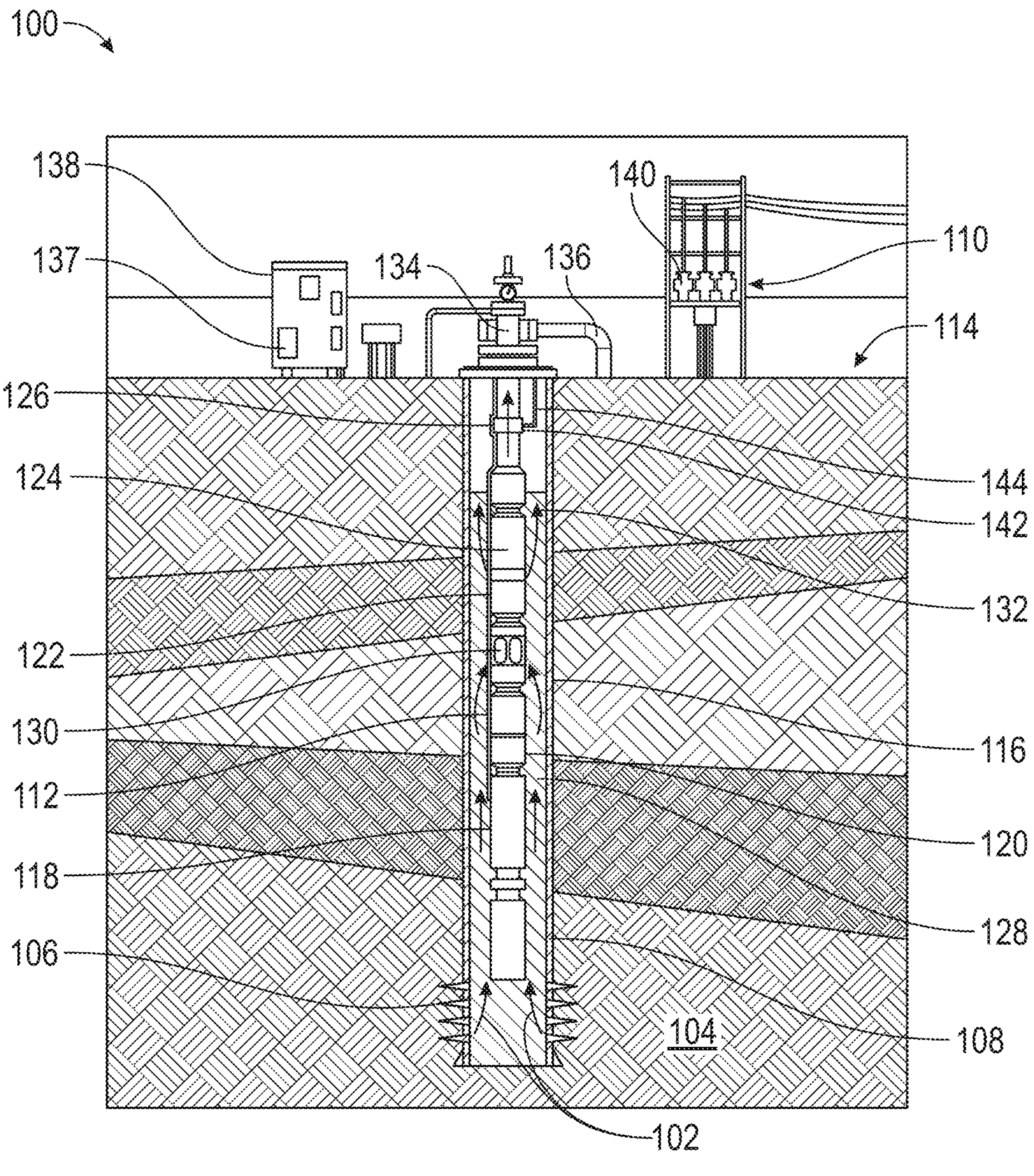
FIG. 1 shows an ESP system in accordance with one or more embodiments.

FIG. 1 shows an ESP system (100) in accordance with one or more embodiments. The ESP system (100) shown in FIG. 1 is for example purposes only and any ESP system (100) configuration may be used without departing from the scope of the disclosure herein. As outlined above, an ESP system (100) is used to help produce produced fluids (102) from a formation (104). Perforations (106) in the well's (116) casing string (108) provide a conduit for the produced fluids (102) to enter the well (116) from the formation (104). The ESP system (100) includes surface equipment (110) and an ESP string (112). The ESP string (112) is deployed in a well (116) and the surface equipment (110) is located on the surface (114). The surface (114) is any location outside of the well (116), such as the Earth's surface.

The ESP string (112) may include a motor (118), motor protectors (120), a gas separator (122), a multi-stage centrifugal pump (124) (herein called a "pump" (124)), and an electrical cable (126). The ESP string (112) may also include various pipe segments of different lengths to connect the components of the ESP string (112). The motor (118) is a downhole submersible motor (118) that provides power to the pump (124). The motor (118) may be a two-pole, three-phase, squirrel-cage induction electric motor (118). The motor's (118) operating voltages, currents, and horsepower ratings may change depending on the requirements of the operation.

The size of the motor (118) is dictated by the amount of power that the pump (124) requires to lift an estimated volume of produced fluids (102) from the bottom of the well (116) to the surface (114). The motor (118) is cooled by the produced fluids (102) passing over the motor (118) housing. The motor (118) is powered by the electrical cable (126). The electrical cable (126) may also provide power to downhole pressure sensors or onboard electronics that may be used for communication.

The electrical cable (126) is an electrically conductive cable that is capable of transferring information. The electrical cable (126) transfers energy from the surface equipment (110) to the motor (118). The electrical cable (126) may be a three-phase electric cable that is specially designed for downhole environments. The electrical cable (126) may be clamped to the ESP string (112) in order to limit electrical cable (126) movement in the well (116). In further embodiments, the ESP string (112) may have a hydraulic line that is a conduit for hydraulic fluid. The hydraulic line may act as a sensor to measure downhole parameters such as discharge pressure from the outlet of the pump (124).

Motor protectors (120) are located above (i.e., closer to the surface (114)) the motor (118) in the ESP string (112). The motor protectors (120) are a seal section that houses a thrust bearing. The thrust bearing accommodates axial thrust from the pump (124) such that the motor (118) is protected from axial thrust. The seals isolate the motor (118) from produced fluids (102). The seals further equalize the pressure in the annulus (128) with the pressure in the motor (118). The annulus (128) is the space in the well (116) between the casing string (108) and the ESP string (112). The pump intake (130) is the section of the ESP string (112) where the produced fluids (102) enter the ESP string (112) from the annulus (128).

The pump intake (130) is located above the motor protectors (120) and below the pump (124). The depth of the pump intake (130) is designed based off of the formation (104) pressure, estimated height of produced fluids (102) in the annulus (128), and optimization of pump (124) performance. If the produced fluids (102) have associated gas, then a gas separator (122) may be installed in the ESP string (112) above the pump intake (130) but below the pump (124). The gas separator (122) removes the gas from the produced fluids (102) and injects the gas (depicted as separated gas (132) in FIG. 1) into the annulus (128). If the volume of gas exceeds a designated limit, a gas handling device may be installed below the gas separator (122) and above the pump intake (130).

The pump (124) is located above the gas separator (122) and lifts the produced fluids (102) to the surface (114). The pump (124) has a plurality of stages that are stacked upon one another. Each stage contains a rotating impeller and stationary diffuser. As the produced fluids (102) enter each stage, the produced fluids (102) pass through the rotating impeller to be centrifuged radially outward gaining energy in the form of velocity. The produced fluids (102) enter the diffuser, and the velocity is converted into pressure. As the produced fluids (102) pass through each stage, the pressure continually increases until the produced fluids (102) obtain the designated discharge pressure and has sufficient energy to flow to the surface (114).

In other embodiments, sensors may be installed in various locations along the ESP string (112) to gather downhole data such as pump intake volumes, discharge pressures, and temperatures. The number of stages is determined prior to installation based of the estimated required discharge pressure. Over time, the formation (104) pressure may decrease and the height of the produced fluids (102) in the annulus (128) may decrease. In these cases, the ESP string (112) may be removed and resized. Once the produced fluids (102) reach the surface (114), the produced fluids (102) flow through the wellhead (134) into production equipment (136). The production equipment (136) may be any equipment that can gather or transport the produced fluids (102) such as a pipeline or a tank.

The ESP system may include a sub-surface safety valve (SSSV) (142) installed within the ESP string (112). The SSSV (142) may be installed near the surface (114). The SSSV (142) is a valve, such as a flapper valve, that may be used to block the produced fluids (102) from flowing up the ESP string (112) and to the surface (114).

The SSSV (142) may be used as part of the shut-in system of the well (116). In scenarios where the well (116) needs to be shut in, such as for repairs or in an emergency, the SSSV (142) along with other valves located in the wellhead (134) are closed. The SSSV (142) may be controlled using a SSSV control line (144). The SSSV control line (144) may connect the SSSV (142) to a control module at the surface (114). The SSSV control line (144) may be a conduit for hydraulic fluid. The control module may use the hydraulic fluid, within the SSSV control line (144), to open or close the SSSV (142).

The remainder of the ESP system (100) includes various surface equipment (110) such as electric drives (137), pump control equipment (138), the control module, and an electric power supply (140). The electric power supply (140) provides energy to the motor (118) through the electrical cable (126). The electric power supply (140) may be a commercial power distribution system or a portable power source such as a generator.

The pump control equipment (138) is made up of an assortment of intelligent unit-programmable controllers and drives which maintain the proper flow of electricity to the motor (118) such as fixed-frequency switchboards, soft-start controllers, and variable speed controllers. The electric drives (137) may be variable speed drives which read the downhole data, recorded by the sensors, and may scale back or ramp up the motor (118) speed to optimize the pump (124) efficiency and production rate. The electric drives (137) allow the pump (124) to operate continuously and intermittently or be shut-off in the event of an operational problem.

As outlined above, the present disclosure outlines a split downhole transformer that may be used to provide an electromagnetic bridge for high power applications. In the case of the ESP system (100) described above, the split downhole transformer may be used to provide power to the motor (118). In accordance with one or more embodiments, the split downhole transformer has two components that are deployed separately: a female body containing the primary winding and a male body containing the secondary winding. The two components mate concentrically using an interlocking patterns to improve magnetic flow, reduce losses, and provide mechanical alignment.

Figure 2:
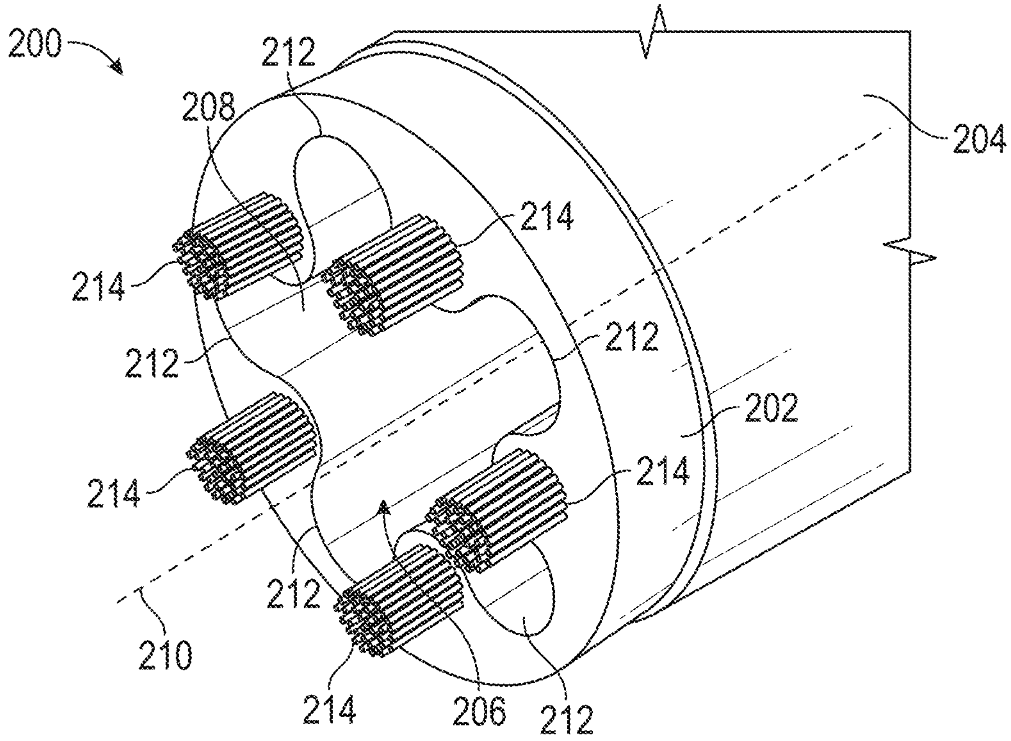
FIG. 2 shows an angled side view of a female component of the split downhole transformer in accordance with one or more embodiments.
Figure 3:
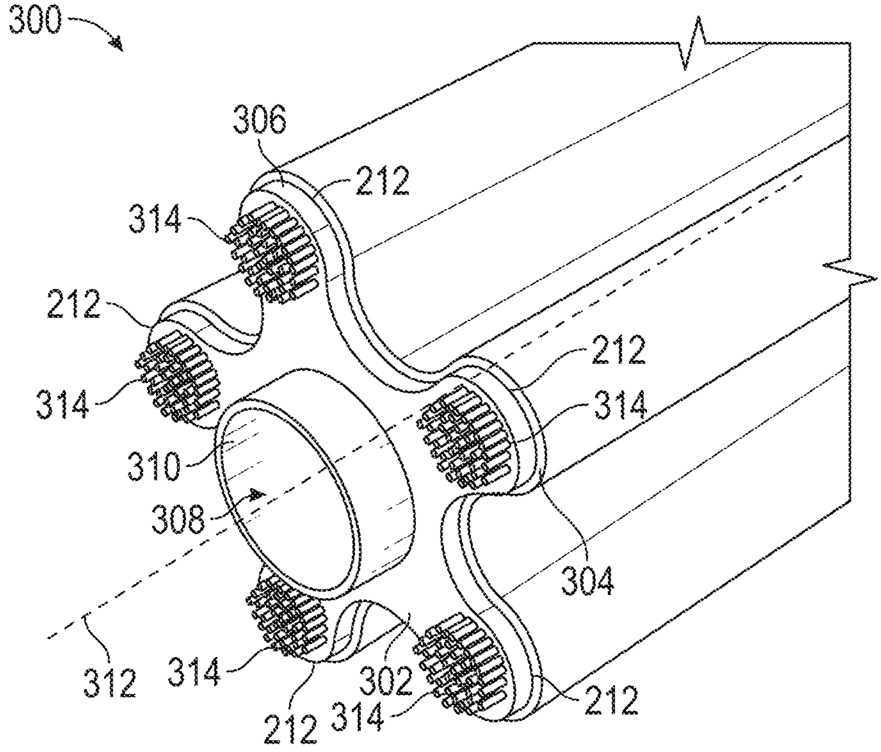
FIG. 3 shows an angled side view of a male component of the split downhole transformer in accordance with one or more embodiments.
Figure 4:
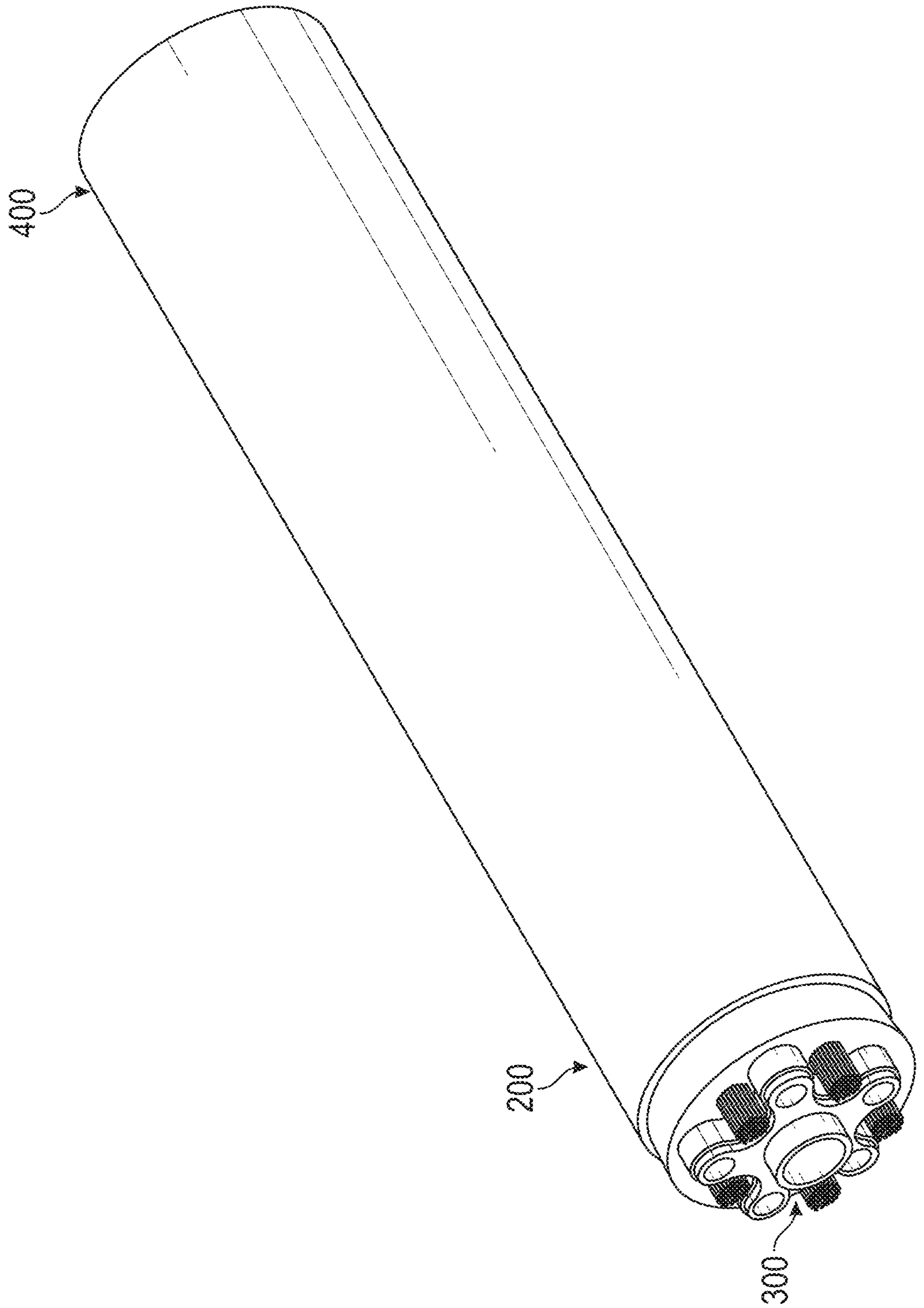
FIG. 4 shows an angled side view of the male component inserted into the female component to form the split downhole transformer in accordance with one or more embodiments.

FIG. 2 shows an angled side view of a female component (200) of the split downhole transformer (400) in accordance with one or more embodiments. FIG. 3 shows an angled side view of a male component (300) of the split downhole transformer (400) in accordance with one or more embodiments. FIG. 4 shows an angled side view of the male component (300) inserted into the female component (200) to form the split downhole transformer (400) in accordance with one or more embodiments.

The female component (200) has a female component body (202) that is disposed in a housing (204). The male component (300) has a male component body (302) that may or may not be disposed in a liner (304) depending on the manufacturing of the male component body (302) (further explained below).

The male component (300) is configured to be disposed inside of and interlock with the female component (200), as shown in FIG. 4. In other words, the male component (300) is smaller than a borehole (206) of the female component (200). Preferably, the male component (300) is sized to fit as flush as possible within the borehole (206) of the female component (200).

In further embodiments, the female component body (202) and the male component body (302) each have an outer diameter and a length where the length is longer than the outer diameter and the length of the male component (300) and the female component (200) are the same size.

The external portion of the female component body (202) is similar to that of a tubular in that the female component body (202) has an external circumferential surface formed like the external circumferential surface of a cylinder. The external circumferential surface of the female component body (202) is housed in a housing (204). The housing (204) may be made of any durable material known in the art that can withstand downhole temperatures and pressures, such as steel.

The female component body (202) has an internal borehole (206) formed in a shape that matches and has the ability to interlock with the external surface (306) of the male component (300). In other words, the female component body (202) has an internal circumferential surface that delineates the internal borehole (206) and forms an interface (208) configured to mate with the external surface (306) of the male component (300). The borehole (206) extends through the center of the female component body (202) from one end to the other along a borehole axis (210) as shown in FIG. 2.

In further embodiments, the female component body (202) may have one or more flow passages (not pictured) that exist outside of the borehole (206) between the borehole (206) and the housing (204). These flow passages may be used to circulate fluid throughout the split downhole transformer (400) to cool the tool.

The male component body (302) has an external surface (306) that is shaped to match the shape of the interface (208)/borehole (206) of the female component (200). The external surface (306) of the male component body (302) may be coated in a liner (304) to protect the male component body (302).

The liner (304) may be made out of a soft material (e.g., Teflon) to both protect the male component body (302) and provide a smooth surface facilitating the insertion and removal of the male component (300) from the borehole (206) of the female component (200). In accordance with one or more embodiments, the liner (304) follows the shape of the external surface (306) of the male component body (302).

The center of the male component (300) is hollow. In other words, the male component (300) has an inner circumferential surface that delineates a conduit (308). The conduit (308) is cylinder-like shaped. The conduit (308) allows for circulation of fluid to cool the split downhole transformer (400).

In accordance with one or more embodiments, the inner circumferential surface of the male component body (302) that delineates the conduit (308) may be lined with a core mandrel (310) to protect the male component body (302). The conduit (308) extends through the center of the male component body (302) from one end to the other along a conduit axis (312) as shown in FIG. 3.

Figure 8:
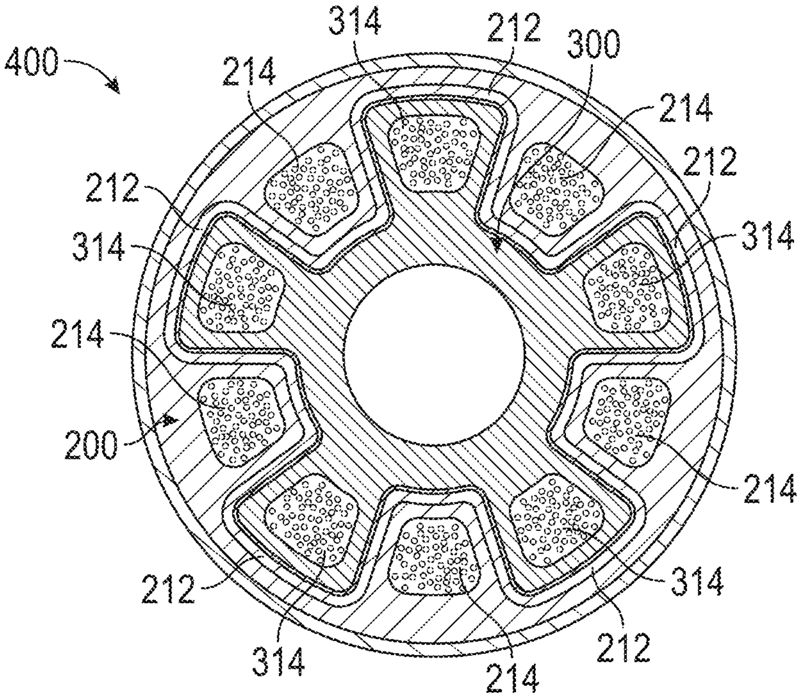
Figure 9:
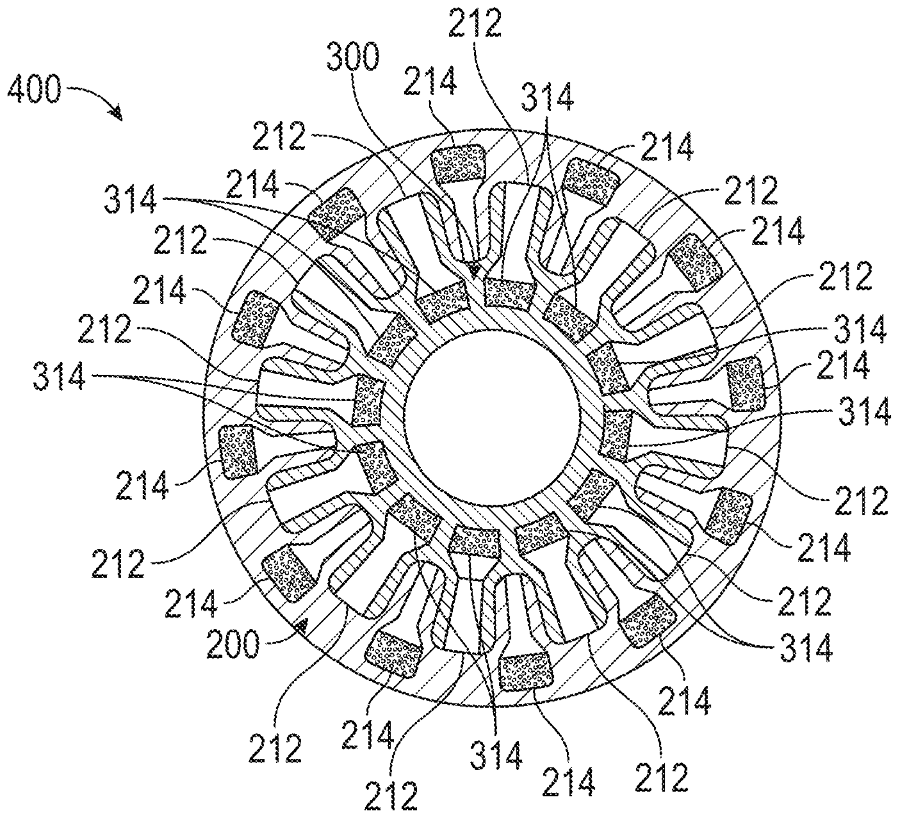

FIG. 2 shows the borehole (206) of the female component (200) having a first shape and FIG. 3 shows the external surface (306) of the male component (300) having the same first shape. The first shape is used herein as an example of how the borehole (206) may be configured in order to sufficiently interlock with the external surface (306) of the male component (300). However, any shape that causes the male component (300) to mate with the female component (200) may be used without departing from the scope of the disclosure herein. Further examples of shapes are shown in FIGS. 8 and 9 below.

The first shape is defined herein by five symmetrically sized lobes (212) interconnected in a star-like shape. For the female component (200), the five lobes (212) are concentrically disposed about the borehole axis (210) extending through the center of the borehole (206). For the male component (300), the five lobes (212) are concentrically disposed about the conduit axis (312) extending through the center of the conduit (308).

In accordance with one or more embodiments, the female component body (202) and the male component body (302) are made of steel laminations. Herein, steel laminations may be synonymous with other terms in the art such as motor laminations, stator laminations, etc. Steel laminations consist of thin lamination sheets stacked together. The laminations can be stacked "loose," welded together, or bonded together depending on the application. Lamination sheets may be used instead of a solid body of steel to reduce eddy current losses.

Herein, steel may refer to a steel alloy that may be mixed with other metals without departing from the scope of the disclosure. For example, the steel in the steel laminations may be silicon steel, also known as electrical steel, which is a steel alloy with silicon added to increase electrical resistance of the steel, improve the ability of a magnetic field to penetrate the steel, and reduce the steel's hysteresis loss.

In such embodiments, the steel laminations are coated with insulation to segment the back-iron structure and break up the path of potential eddy currents which generate losses when an electric field moves past a conductor. Furthermore, to form the female component body (202) and the male component body (302), each steel lamination is stamped from sheet material in the desired shape, such as the first shape. In accordance with one or more embodiments, the male component body (302) made of steel laminations may be cased with the liner (304) and the core mandrel (310) to protect the steel laminations.

In further embodiments and depending on the required shape and thickness of the female component body (202) and the male component body (302), it may be difficult to manufacture the female component body (202) and the male component body (302) using steel laminations due to the deficiencies of using steel laminations to manufacture to precision tolerances.

As such, the female component body (202) and the male component body (302) may be manufactured using powder metallurgy with insulated iron or iron-silicon soft magnetic composites (SMC). This method of manufacture uses pure iron powder with a highly insulating coating to provide a soft magnetic ferrous material that is suitable for a variety of electromagnetic applications. These coated powders offer 3D flux carrying capability compared to steel laminations where flux is maximized in the rolling direction.

In accordance with one or more embodiments, manufacturing the female component body (202) and the male component body (302) using SMC core materials may increase electromagnetic performance by enabling elimination of the liner (304) and the core mandrel (310) around the male component (300) whilst still maintaining pressure/environmental protection from a wellbore.

Further, the use of SMC materials may enable tighter manufacturing tolerances to be achieved, thereby reducing the need for large air gaps between the female component (200) and the male component (300) for clearance fits for installation and removal. A smaller air gap between the two components improves electromagnetic performance and efficiency which, in turn, reduces the active length of the windings required for a power transmission.

The female component body (202) houses the primary coils (214) of the split downhole transformer (400). In accordance with one or more embodiments, the primary coils (214) may be copper windings with characteristics similar to those of stators in standard induction motors. The primary coils (214) are located in a plurality of slots formed in the material located between the borehole (206) and the housing (204) of the female component body (202).

The primary coils (214) are wound through slots which extend through the length of the female component (200). In accordance with one or more embodiments, and as shown in FIG. 2, there are five sets of primary coils (214). Each set of primary coils (214) is circumferentially disposed around the borehole (206) in symmetric intervals. In accordance with one or more embodiments, each set of primary coils (214) is located between two neighboring lobes (212) of the first shape.

The male component body (302) houses the secondary coils (314) of the split downhole transformer (400). In accordance with one or more embodiments, the secondary coils (314) may be copper windings with similar characteristics to those of wound rotors in standard induction motors. The secondary coils (314) are located in a plurality of slots formed in the material located between the conduit (308) and the external surface (306) of the male component body (302).

The secondary coils (314) are wound through slots which extend through the length of the male component (300). In accordance with one or more embodiments, and as shown in FIG. 3, there are five sets of secondary coils (314). Each set of secondary coils (314) is circumferentially disposed about the conduit (308) in symmetric intervals. In accordance with one or more embodiments, each set of secondary coils (314) is located in a lobe (212) of the first shape.

As outlined above, FIG. 4 shows how the male component (300) mates/interlocks with the female component (200) to form the split downhole transformer (400). Specifically, the male component (300) is inserted into the borehole (206) of the female component (200) such that the borehole axis (210) and the conduit axis (312) line up with one another and become one and the same.

The internal shape of the borehole (206) of the female component (200) and the external shape of the external surface (306) of the male component (300) are complementary and interlock with each other. When the male component (300) is inserted into the female component (200), the location of the primary coils (214) and the secondary coils (314), with regards to the lobes (212) of the first shape, allow the primary coils (214) and the secondary coils (314) to alternate with one another and be circumferentially disposed about the borehole axis (210)/conduit axis (312) in symmetric intervals and along the same circular line.

In accordance with one or more embodiments, the gap between the interface (208) of the female component (200) and the external surface (306) (or liner (304)) of the male component (300) is minimized and in a range of 0-10 millimeters. This gap is large enough to allow easy insertion and removal of the male component but small enough to reduce power transmission losses.

Once the male component (300) is installed in the female component (200), the winding patterns of the primary coils (214) and the secondary coils (314) may produce magnetic fields that may be rotational relative to main axis of the split downhole transformer (400). In other embodiments, the produced magnetic fields may be pulsating magnetic fields that increase and decrease towards and away the borehole axis (210)/conduit axis (312) of the split downhole transformer (400).

In accordance with one or more embodiments, the split downhole transformer (400) may include non-conductive coatings or linings on the face of the interface (208) of the female component (200) and the face of the external surface (306) of the male component (300) to provide electrical insulation, reduce eddy currents, protect the components against mechanical damage, and reduce friction during insertion and retrieval of the male component (300). These coatings or linings include magnetic ceramics (e.g., Iron Oxide), amorphous magnetics alloys (e.g., cobalt-zirconium), plastics (e.g., Teflon, PEEK).

Figure 5:
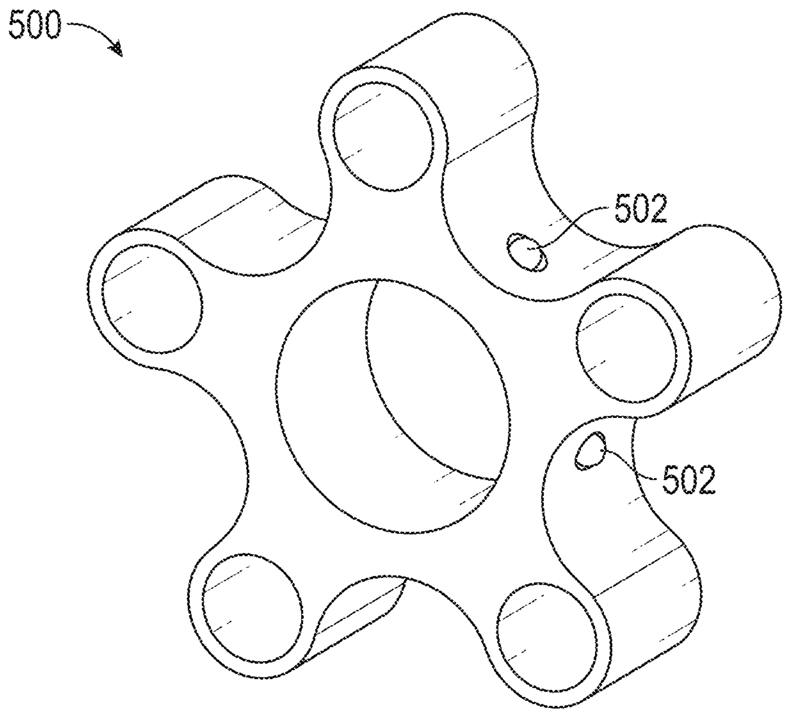
FIGS. 5 and 6 show centralizing sections in accordance with one or more embodiments.
Figure 6:
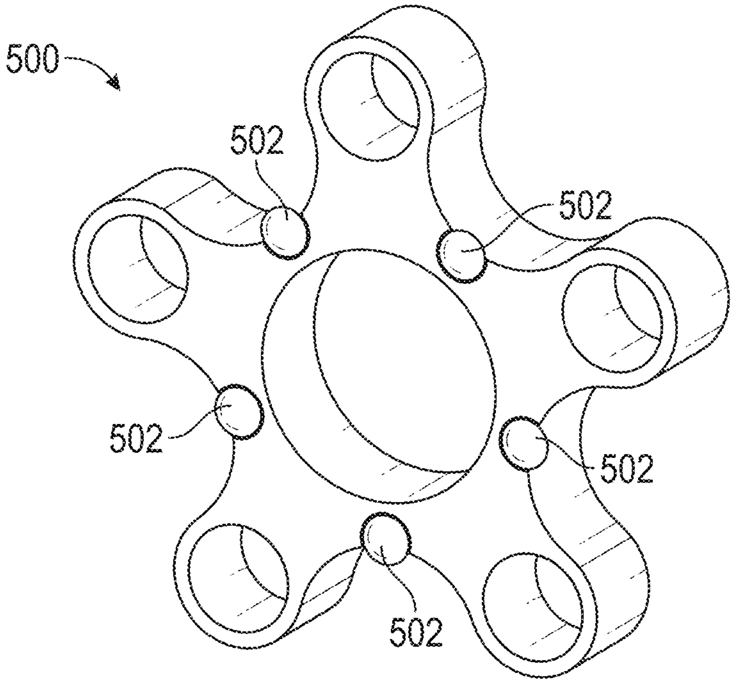

FIGS. 5 and 6 show centralizing sections (500) in accordance with one or more embodiments. The centralizing sections (500) may be made of a softer material (e.g., bronze) and may be oversized with respect to the external perimeter of the male component body (302). Specifically, the centralizing sections (500) may have the same geometry/shape as the male component body (302), including the throughfares for the secondary coils (314) and the conduit (308). FIGS. 5 and 6 shows the centralizing sections (500) having the first shape, as outlined above. However, the centralizing sections (500) may have any shape as long as the shape corresponds to the shape of the external surface (306) of the male component body (302).

In accordance with one or more embodiments, the centralizing sections (500) help centralize the male component (300) within the female component (200). The centralizing sections (500) may also facilitate insertion and extraction of the male component (300) into the female component (200). One or more of the centralizing sections (500) can be installed in series with the male component body (302) and spaced out along the length of the male component (300). Similar centralizing sections (500) may be installed in the borehole (206) of the female component (200).

The centralizing sections (500) may contain bearings (502), such as ball bearings. The bearings (502) may be located on the face of the centralizing sections (500), as shown in FIG. 6, or the bearings (502) may be located on the perimeter of the centralizing sections (500), as shown in FIG. 5. When located on the face, the bearings (502) perform the function of a key to prevent rotation and radially lock the centralizing section (500) to the male component body (302) to prevent rotation and damage to the secondary coils (314). In this scenario, the male component body (302) may include corresponding key holes (not pictured) that receive the bearings (502) to radially lock the centralizing sections (500) with the male component body (302). When located on the perimeter, the bearings (502) perform the function of creating a centralization and also reducing friction when the male component (300) is moved within the female component.

In accordance with one or more embodiments, avoiding an eccentric male component (300) using the centralizing sections (500) is desirable because it minimizes unbalanced radial electromagnetic forces which would cause the component to oscillate/vibrate with the alternating current and rotating magnetic field of the device. Furthermore, centralization of the male component (300) avoids unbalanced electrical phases, which would cause problems for maintaining control of the motor, and reduces the eddy current losses of the machine which would excessively heat the device and reduce the overall power efficiency.

Figure 7:
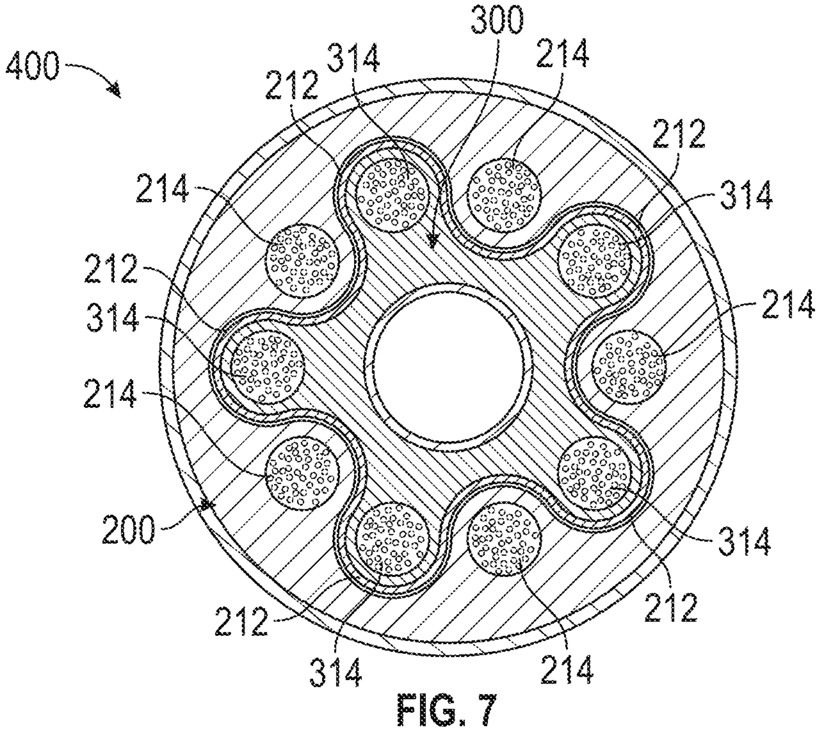
FIGS. 7-9 show a cross section of the split downhole transformer when the male component is installed in the female component in accordance with one or more embodiments.

FIGS. 7-9 show a cross section of the split downhole transformer (400) when the male component (300) is installed in the female component (200) in accordance with one or more embodiments. Components shown in FIGS. 7-9 that are the same as or similar to components shown in FIGS. 2-3 have not been redescribed for purposes of readability and have the same design and function as outlined above. FIG. 7 shows a cross section of the split downhole transformer (400) with the components having the first shape, described above and in accordance with one or more embodiments.

FIG. 8 shows a cross section of the split downhole transformer (400) having a second shape in accordance with one or more embodiments. FIG. 9 shows a cross section of the split downhole transformer (400) having a third shape in accordance with one or more embodiments. FIGS. 8 and 9 are not meant to be limiting and are provided to show alternative examples of the shape of the female component (200) and the male component (300).

The second shape, shown in FIG. 8, is similar to the first shape in having five lobes (212) that are interconnected in a star-like shape. However, each lobe (212) in the first shape are formed in a circular-like shape whereas each lobe (212) in the second shape is formed in a rectangular-like shape and has rounded corners.

The third shape, shown in FIG. 9, has twelve lobes (212) each formed in an elongated rectangular-like shape, elongated when compared to the first and second shape, with rounded corners. For all three shapes, the primary coils (214) extend through the female component body (202) at a location between corresponding lobes (212) and the secondary coils (314) extend through each lobe (212) of the male component body (302).

As stated above, the male component (300) and the female component (200) may have any shape known in the art that allows the male component (300) to mate/interlock with the female component (200). Specifically, the shapes of the male component (300) and the female component (200) should correspond to one another, provide self-alignment, and prevent rotation between the two components.

The specific design of the shape may be optimized to increase the contact surface between the two components to improve magnetic flux distribution, reduce magnetic losses, increase power transmission, and improve overall transformer efficiency.

The slots where the primary coils (214) and secondary coils (314) run through the female component (200) and the male component (300), respectively, may be shaped, arranged/distributed in various ways to maximize efficiency. In accordance with one or more embodiments, the distance between the center of the slots and the borehole axis (210)/conduit axis (312) may be the same for both the primary coils (214) and the secondary coils (314), as shown in the first shape and the second shape shown in FIGS. 7 and 8, respectively.

In other embodiments, the distance between the center of the slots and the borehole axis (210)/conduit axis (312) may be different between the primary coils (214) and secondary coils (314). For example, as shown in FIG. 9, the center of each slot for the secondary coils (314) is further away from the borehole axis (210)/conduit axis (312) than the center of each slot for the primary coils (214). The objective of the shape and positioning of the slot is to allow better magnetic flux density distribution, maximum power density and optimum transformer efficiency.

Figure 10:
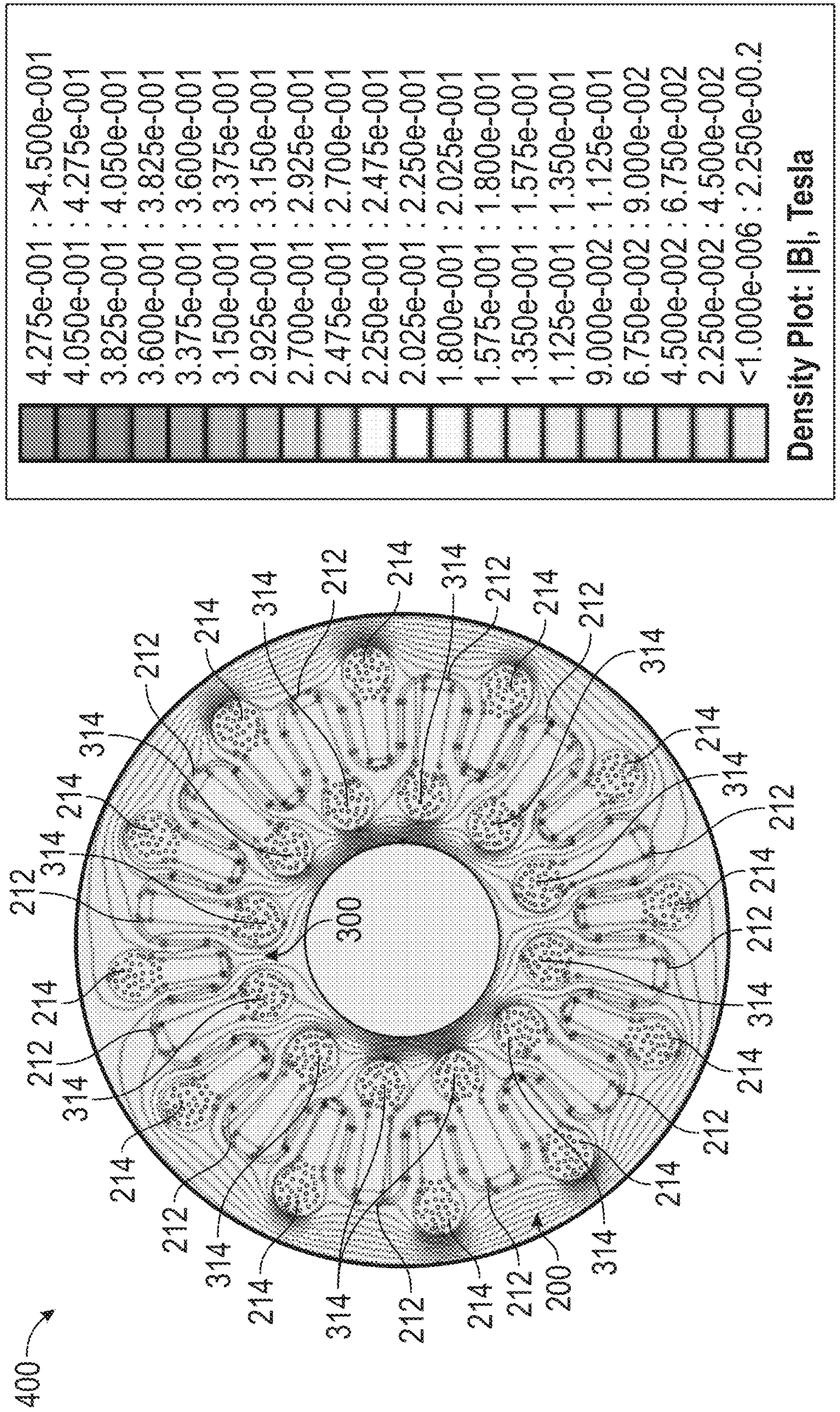
FIG. 10 shows a magnetic field of a cross section of the split downhole transformer (400) in accordance with one or more embodiments.

FIG. 10 shows a magnetic field of a cross section of the split downhole transformer (400) in accordance with one or more embodiments. Specifically, FIG. 10 shows the cross section having the third shape, as outlined in FIG. 9. FIG. 10 shows how the magnetic field is distributed about the split downhole transformer (400) when the components are in the third shape. FIG. 10 is used to show how the shape and position of the slots for the primary coils (214) and the secondary coils (314) may be manipulated to change the magnetic field of the components.

Figure 11B:
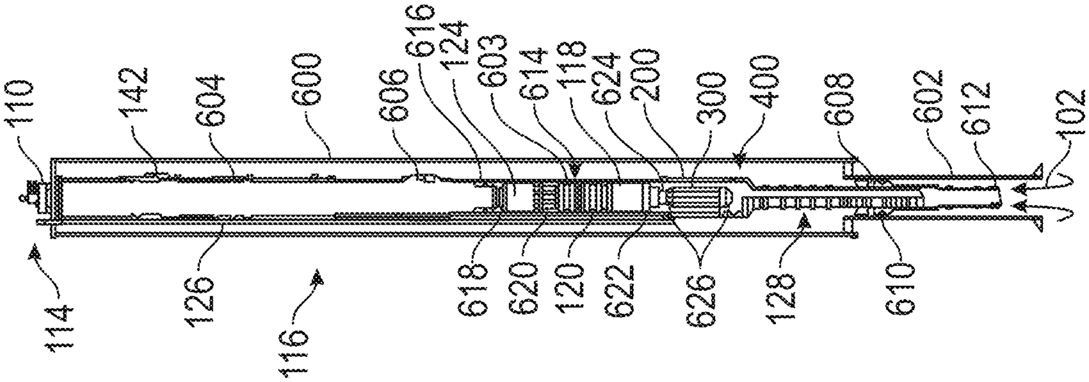
FIGS. 11*a* and 11*b* show the split downhole transformer being used to install an ESP system into a well in accordance with one or more embodiments.
Figure 11A:
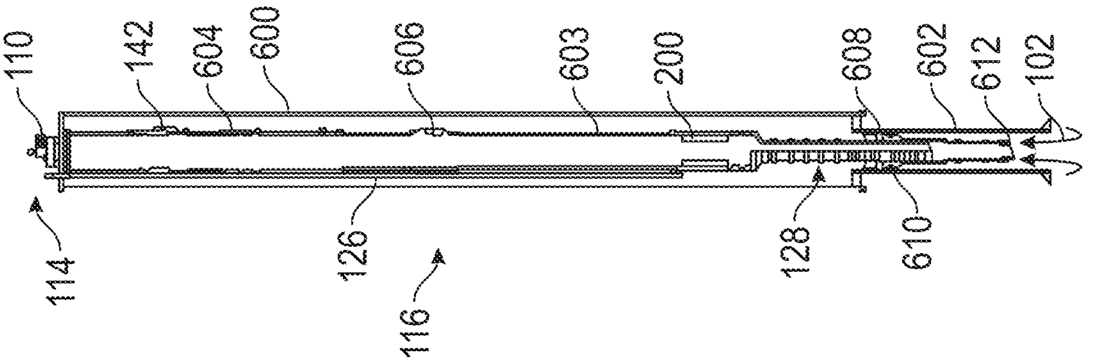

FIGS. 11*a* and 11*b* show the split downhole transformer (400) being used to install an ESP system into a well (116) in accordance with one or more embodiments. The ESP system shown in FIGS. 11*a* and 11*b* is similar to the ESP system (100) disclosed in FIG. 1. Thus, components shown in FIGS. 11*a* and 11*b* that are the same as or similar to the ESP system (100) components shown in FIG. 1 have not been redescribed for purposes of readability and have the same design and function as outlined above.

A person skilled in the art will appreciate that the ESP system (100) shown in FIG. 1 and the ESP system shown in FIGS. 11*a* and 11*b* are used for example purposes and any ESP configuration, using the split downhole transformer (400) as disclosed herein, may be used without departing from the scope of the disclosure herein.

As stated above, FIGS. 11*a* and 11*b* show how the split downhole transformer (400), described above in FIGS. 2-10, may be used in practice. Thus, components shown in FIGS. 11*a* and 11*b* that are the same as or similar to the split downhole transformer (400) components shown in FIGS. 2-10 have not been redescribed for purposes of readability and have the same design and function as outlined above.

Furthermore, the present disclosure uses an electric submersible pump (ESP) system to outline an application in which the split downhole transformer (400) may be used. However, a person skilled in the art will appreciate that the split downhole transformer (400) disclosed herein may be used to provide an electromagnetic bridge for any electrically powered tool that may be installed downhole in a well, such as separation systems, flow meters, sensors, actuators, etc.

Turning to FIG. 11*a*, the well (116) is shown completed with production casing (600) and production liner (602). The production casing (600) and the production liner (602) are similar to the casing string (108) of FIG. 1 in that they form the inner most portion of the well (116) and delineate the annulus (128) outside of the production tubing (603). The production casing (600) extends from the surface (114) downhole into the well (116). The production liner (602) is hung within the production casing (600) and extends from the production casing (600) further downhole into the well (116).

In accordance with one or more embodiments, the production liner (602) is completed to enable the produced fluids (102) to flow from a formation, such as the formation (104) outlined in FIG. 1, into the production liner (602). For example, the production liner (602) may be perforated to allow the produced fluids (102) to enter the production liner (602). In another example, the production liner (602) may be slotted liner to allow the produced fluids (102) to enter the production liner (602). In further embodiments, the production liner (602) extends to a height above the producing formation and the well (116) has an open-hole completion scheme.

Production tubing (603) is disposed inside of the production casing (600) and extends into the production liner (602). The production tubing (603) runs from the surface (114) into the production liner (602). The production tubing (603) is designed to provide a conduit for produced fluids (102) to flow from the formation to the surface (114). In accordance with one or more embodiments, production tubing (603) is a series of tubulars threaded together.

The production tubing (603) includes equipment that may be used to aid in the production of produced fluids (102). In accordance with one or more embodiments and in order from closest to the surface (114) to furthest downhole, the production tubing (603) includes an SSSV (142), a nipple profile (604), a permanent gauge (606), a production packer (608), a packer seal assembly (610), and a wireline entry guide (612).

In accordance with one or more embodiments, the production packer (608) is disposed on the outside of the production tubing (603) and is used to seal the annulus (128) between the production tubing (603) and the production liner (602)/production casing (600). With the annulus (128) sealed, the produced fluids (102) are directed into the inside of the production tubing (603) via the wireline entry guide (612).

The female component (200) of the split downhole transformer (400) is installed inside of or in series with the production tubing (603). In accordance with one or more embodiments, the female component (200) is installed on the production tubing (603) downhole from the permanent gauge (606) and up hole from the production packer (608).

In accordance with one or more embodiments, the female component (200) is installed inside of the production tubing (603). In such embodiments, the housing (204) of the female component (200) is designed to mate with the inner circumferential surface of the production tubing (603). For example, the housing (204) may have lock dogs that mate with grooves in the inner circumferential surface of the production tubing (603).

In other embodiments, the female component (200) is installed in series with the production tubing (603). That is, the female component (200) may be installed between two adjacent joints of tubulars that make up the production tubing (603). In such embodiments, the housing (204) of the female component (200) may be connected to the adjacent tubulars using any connections known in the art, such as a welded connection, a threaded connection, a bolted connection, etc.

An electrical cable (126) extends from the surface (114) to the female component (200) downhole. The electrical cable (126) provides power from the surface equipment (110) to the female component (200). As can be seen from FIGS. 11*a* and 11*b*, the electrical cable (126) is run in the annulus (128) between the production tubing (603) and the production casing (600).

Because the female component (200) is located up hole from the production packer (608), the electrical cable (126) connects to the female component (200) at a location up hole from the production packer (608). As outlined above, the production packer (608) prevents the produced fluids (102) from flowing up hole from the production packer (608), thus the electrical cable (126) is able to connect to the female component (200) in an environment not containing produced fluids (102).

Furthermore, the connection between the electrical cable (126) and the female component (200) may be permanent, i.e., unable to connect or disconnect downhole, further securing the connection and avoiding opportunities for failure due to fluid contamination. The production tubing (603) shown in FIGS. 11*a* and 11*b* may be installed in the well (116) in a rig or rigless operation depending on the length of the production tubing (603).

In accordance with one or more embodiments, the nipple profile (604) may be a n R or X type nipple that is designed to allow common slickline plugs and equipment to be placed successfully downhole in the well (116). The internal profile of nipple profile (604) includes a shoulder that engages the no-go of the appropriate lock, a locking recess, and a polished bore.

In accordance with one or more embodiments, the permanent gauge (606) may include pressure and temperature gauges, amongst others. The permanent gauge (606) is installed in the completions for real-time data acquisition and monitoring in a well (116). A purpose of installing the permanent gauge (606) is for observation and production optimization. A function of a permanent gauge (606) is to monitor pressure at a single point or multiple points in a well (116).

In accordance with one or more embodiments, the packer seal assembly (610) is a polished bore assembly that seals between the lower completion and the upper completion with annular isolation provided by the production packer (608).

In accordance with one or more embodiments, the wireline entry guide (612) is made up to the bottom of the last joint of tubing in the production tubing (603). The wireline entry guide (612) is shaped on the downhole end to ensures a smooth and guided re-entry of the wireline or coil tubing tool strings back into the production tubing (603) after completion of logging or well intervention operations in the well (116). The smooth edges prevent cutting of wireline or slickline cable during logging operations.

FIG. 11*b* shows the completed ESP system. Specifically, a pumping tool (614), including the pump (124) and motor (118) of the ESP system, are run inside of the production tubing (603) to complete the ESP system. In accordance with one or more embodiments and listed in order from closest to the surface (114) to furthest downhole, the pumping tool (614) includes a pump seal assembly (616), a bolt-on discharge (618), the pump (124), a bolt-on intake (620), motor protectors (120), the motor (118), a sensor gauge (622), a shuttle motor connector (624), and the male component (300).

In accordance with one or more embodiments, the pump seal assembly (616) is used to prevent recirculation of fluid between the intake and the discharge of the pump (124). It is set and unset when the pumping tool (614) is run or removed from the production tubing (603). This device may have functionality similar to a typical packer (608) (as opposed to a polished seal bore device like the packer seal assembly (610)).

In accordance with one or more embodiments, the bolt-on discharge (618) may be the location of the pump discharge. In accordance with one or more embodiments, the pump discharge is a separate component that bolts onto the top of the pump (124). In this case, this component connects/seals between the pump seal assembly (616) and the pump outlet.

In accordance with one or more embodiments, the bolt-on intake (620) is the location where the produced fluids (102) enter the pump (124). In accordance with one or more embodiments, the pump intake is a separate component that bolts onto the bottom of the pump (124).

In accordance with one or more embodiments, the sensor gauge (622) is fit to the ESP system and uses cable-to-surface communication protocols to monitor parameters such as tubing, annulus, and other pressures; tubing and annulus temperatures; and vibration. The sensor gauge (622) may be used in addition to measurements from a permanent gauge (606).

In accordance with one or more embodiments, the shuttle motor connector ( ) electronically and mechanically connects the male component (300) to the remainder of the pumping tool (614). The shuttle motor connector (624) contains sealed electrical connections to the motor (118) and also flow ports from the flow conduit (308) within the male component (300)

The male component (300) is inserted into the female component (200) to complete the split downhole transformer (400) and enable power transmission between the electrical cable (126) and the motor (118)/pump (124). The pumping tool (614) may be lowered into the inside of the production tubing (603) using a rig or rigless operation.

In a rig operation, the pumping tool (614) may be lowered into the production tubing (603) using drill pipe. The drill pipe may be releasably connected to the pumping tool (614). In accordance with one or more embodiments, the drill pipe is releasably connected to the pump seal assembly (616) of the pumping tool (614). The drill pipe may be releasably connected to the pumping tool (614) using any tool known in the art, such as a pressure release tool or an electronic release tool.

Once the male component (300) is inserted into the female component (200), the drill pipe may be released from the pumping tool (614). When the drill pipe is released from the pumping tool (614), the pumping tool (614) is left behind in the well (116) and the drill pipe may be removed from the well (116). At this point, the well (116) may be put on production.

In a rigless operation, the pumping tool (614) may be lowered into the production tubing (603) using a wireline or slickline. The wireline or slickline may be releasably connected to the pumping tool (614). In accordance with one or more embodiments, the wireline or slickline is releasably connected to the pump seal assembly (616) of the pumping tool (614). The wireline or slickline may be releasably connected to the pumping tool (614) using any tool known in the art, such as a pressure release tool or an electronic release tool.

Once the male component (300) is inserted into the female component (200), the wireline or slickline may be released from the pumping tool (614). When the wireline or slickline is released from the pumping tool (614), the pumping tool (614) is left behind in the well (116) and the wireline or slickline may be removed from the well (116). At this point, the well (116) may be put on production.

In accordance with one or more embodiments and after the male component (300) is inserted into the female component (200), power may be transferred from the surface equipment (110) to the downhole split transformer (400) using the electrical cable (126). The downhole split transformer (400) powers the motor (118) which operates the pump (124) to pump the produced fluids (102) from the formation, through the orifices of the split downhole transformer (400) (such as through the conduit (308) of the male component (300)), through the interior of the pumping tool (614), through the interior of the production tubing (603), and to the surface equipment (110). In accordance with one or more embodiments, the produced fluids (102) enter and exit the split downhole transformer (400) using flow ports (626) located on one or both ends of the split downhole transformer (400).

Figure 12:
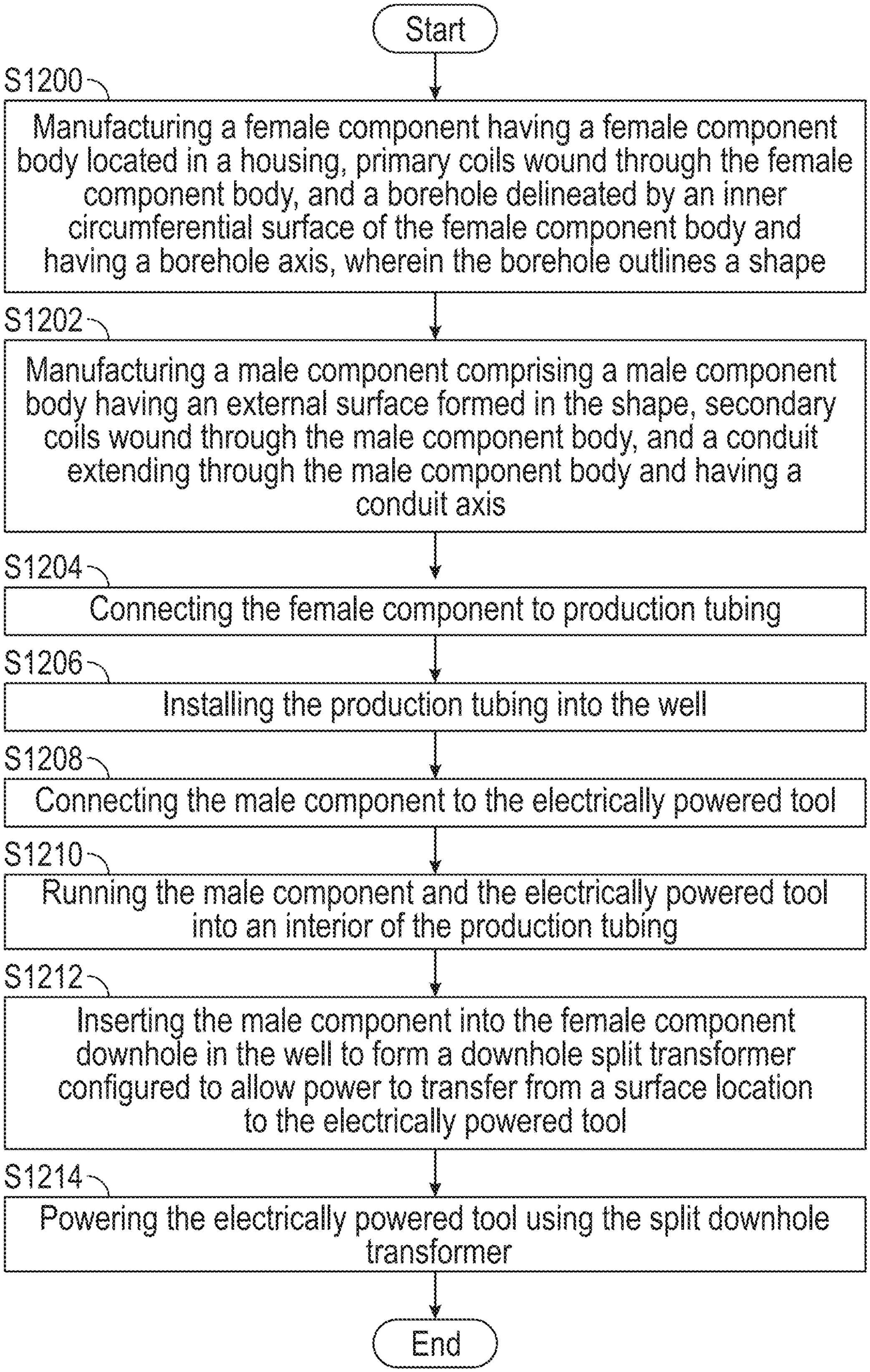
FIG. 12 shows a flowchart in accordance with one or more embodiments.

FIG. 12 shows a flowchart in accordance with one or more embodiments. The flowchart outlines a method for powering an electrically powered tool downhole in a well (116). While the various blocks in FIG. 12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In S1200, a female component (200) having a female component body (202) located in a housing (204), primary coils (214) wound through the female component body (202), and a borehole (206) delineated by an inner circumferential surface of the female component body (202) and having a borehole axis (210) is manufactured. The borehole (206) outlines a shape.

In S1202, a male component (300) comprising a male component body (302) having an external surface (306) formed in the shape, secondary coils (314) wound through the male component body (302), and a conduit (308) extending through the male component body (302) and having a conduit axis (312) is manufactured.

In accordance with one or more embodiments, the male component (300) is configured to be inserted into the borehole (206) of the female component (200). As such, the borehole (206) of the female component (200) and the external surface (306) of the male component (300) are formed in the same shape such that they interlock with one another when the male component (300) is inserted into the female component (200). The shape may be any shape known in the art that prevents rotation of the male component (300) within the female component (200). For example, the shape may be the first, second, or third shapes outlined above in FIGS. 7-9.

The male component body (302) and the female component body (202) may be manufactured using any means known in the art. For example, the male component body (302) and the female component body (202) may be manufactured using steel laminations.

When the bodies are manufactured using steel laminations, the steel laminations may need to be protected. As such, the perimeter of the external surface (306) of the male component body (302) may be coated in a liner (304) and the conduit (308) may be coated with a core mandrel. In other words, the liner (304) may be formed around the perimeter of the external surface (306) and the core mandrel (310) may be inserted into the conduit (308) of the male component (300).

In other embodiments, the male component body (302) and the female component body (202) may be manufactured using coated powder metallurgy. For example, the male component body (302) and the female component body (202) may be formed using iron-silicon soft magnetic composites.

The male component body (302) may also be formed in series with centralizing sections (500). The centralizing sections (500) are outlined in FIGS. 5 and 6. The centralizing sections (500) are formed in the same shape as the borehole (206) and the external surface (306) of the male component body (302). However, the centralizing sections (500) are slightly larger in diameter than the male component body (302). This allows the centralizing sections (500) to centralize the male component (300) within the female component (200).

In S1204, the female component (200) is connected to the production tubing (603). In accordance with one or more embodiments, the female component (200) is installed inside the production tubing (603). In other embodiments, the female component (200) is installed in series with the production tubing (603). In particular, the female component (200) may be connected to two neighboring tubulars that make up the production tubing (603).

In S1206, the production tubing (603) is installed in the well (116). The production tubing (603) may be installed in the well (116) using a rig or rigless operation. Because the female component (200) is connected to the production tubing (603), the female component (200) is also installed in the well (116) when the production tubing (603) is installed in the well (116).

In S1208, the male component (300) is connected to the electrically powered tool. In S1210, the male component (300) and the electrically powered tool are run into an interior of the production tubing (603). In S1212, the male component (300) is inserted into the female component (200) downhole in the well (116) to form a downhole split transformer (400) configured to allow power to transfer from a surface (114) location to the electrically powered tool. In S1214, the electrically powered tool is powered using the split downhole transformer (400).

The electrically powered tool may be any type of tool that would be installed downhole in a well and requires electric power to operate, such as a separation systems, flow meters, sensors, actuators, etc. In accordance with one or more embodiments, the electrically powered tool is an ESP system, such as the ESP systems outlined in FIGS. 1, 11*a*, and 11*b*.

When the electrically powered tool is an ESP system, the male component (300) may be connected to a pumping tool (614) including the pump (124) and the motor (118) of the ESP system. In such embodiments, the pumping tool (614) is lowered into the production tubing (603) to insert the male component (300) into the female component (200).

Once the male component (300) is inserted into the female component (200) a power bridge now exists via the downhole split transformer (400). As such, power may be transferred from the surface (114) through an electrical cable (126) and the downhole split transformer (400) to the motor (118) and the pump (124). The pump (124) may operate to pump produced fluids (102) to the surface (114) through the interior of the production tubing (603).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for powering an electrically powered tool downhole in a well, the system comprising:
- production tubing installed in the well;
- a female component connected to the production tubing and comprising:
  - a female component body located in a housing;
  - primary coils wound through the female component body; and
  - a borehole delineated by an inner circumferential surface of the female component body and having a borehole axis, wherein the borehole outlines a shape;
- a male component electrically connected to the electrically powered tool and configured to be inserted into the borehole of the female component, the male component comprising:
  - a male component body having an external surface formed in the shape;
  - centralizing sections installed in series with the male component body, formed in the shape, and comprising bearings;
  - secondary coils wound through the male component body; and
  - a conduit extending through the male component body and having a conduit axis, wherein the borehole axis and the conduit axis line up when the male component is inserted into the borehole of the female component; and
- a split downhole transformer formed by installation of the male component into the female component, wherein formation of the split downhole transformer allows power to transfer from a surface location to the electrically powered tool installed in the production tubing downhole in the well.

2. The system of claim 1, wherein the male component and the female component are manufactured using steel laminations.

3. The system of claim 2, wherein the male component comprises a liner extending around a perimeter of the external surface and a core mandrel inserted into the conduit.

4. The system of claim 1, wherein the male component and the female component are manufactured using coated powder metallurgy.

5. The system of claim 4, wherein the coated powder metallurgy uses iron-silicon soft magnetic composites.

6. The system of claim 1, wherein the shape comprises interconnected lobes formed in a star-like shape.

7. The system of claim 1, wherein the electrically powered tool downhole further comprises an electric submersible pump system.

8. The system of claim 7, wherein the male component is located within a pumping tool comprising a pump and a motor.

9. The system of claim 8, wherein the pumping tool is configured to be inserted into an interior of the production tubing to allow the male component to mate with the female component.

10. A method for powering an electrically powered tool downhole in a well, the method comprising:
- manufacturing a female component comprising:
  - a female component body located in a housing;
  - primary coils wound through the female component body; and
  - a borehole delineated by an inner circumferential surface of the female component body and having a borehole axis, wherein the borehole outlines a shape;
- manufacturing a male component comprising:
  - a male component body having an external surface formed in the shape;
  - centralizing sections installed in series with the male component body, formed in the shape, and comprising bearings
  - secondary coils wound through the male component body; and
  - a conduit extending through the male component body and having a conduit axis;
- connecting the female component to production tubing;
- installing the production tubing into the well;
- connecting the male component to the electrically powered tool;
- running the male component and the electrically powered tool into an interior of the production tubing;
- inserting the male component into the female component downhole in the well to form a downhole split transformer configured to allow power to transfer from a surface location to the electrically powered tool; and
- powering the electrically powered tool using the split downhole transformer.

11. The method of claim 10, wherein manufacturing the male component and the female component further comprises forming the male component body and the female component body using steel laminations.

12. The method of claim 11, wherein manufacturing the male component further comprises forming a liner around a perimeter of the external surface and inserting a core mandrel into the conduit of the male component.

13. The method of claim 10, wherein manufacturing the male component and the female component further comprises forming the male component body and the female component body using coated powder metallurgy.

14. The method of claim 13, wherein forming the male component body and the female component body using coated powder metallurgy further comprises using iron-silicon soft magnetic composites.

15. The method of claim 10, wherein the shape comprises interconnected lobes formed in a star-like shape.

16. The method of claim 10, wherein the electrically powered tool downhole further comprises an electric submersible pump system.

17. The method of claim 16, wherein connecting the male component to the electrically powered tool further comprises connecting the male component to a pumping tool comprising a pump and a motor.

18. The method of claim 17, wherein inserting the male component into the female component downhole in the well to form the downhole split transformer further comprises inserting the pumping tool into the interior of the production tubing to allow the male component to mate with the female component.

* * * * *